July 31, 1962  J. BARABÁS ETAL  3,046,837
CONDENSER FOR INCREASING THE RESOLVING
POWER OF MICROSCOPES
Filed Jan. 12, 1959  2 Sheets-Sheet 1
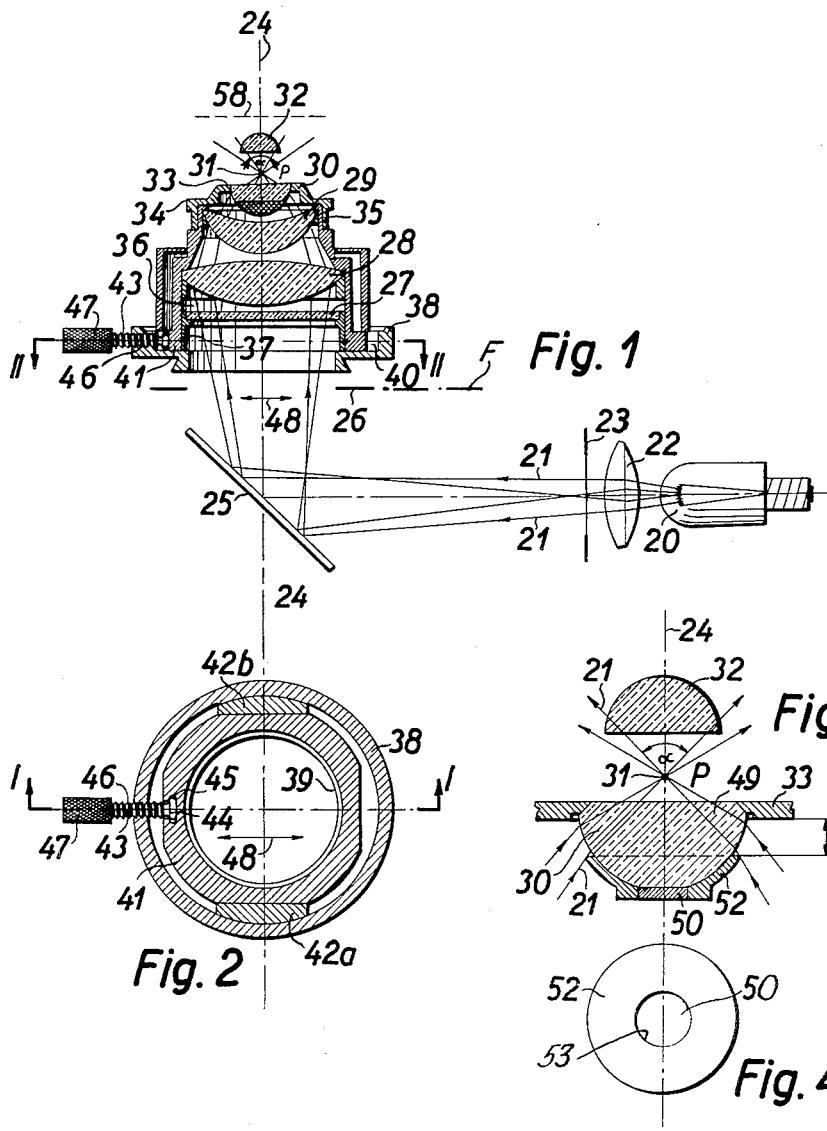
INVENTORS
JANOS BARABÁS, LASZLO
ZSELYONKA FERENC
BY KISS AND ALBERT LIBIK
Robert H. Jacob
AGT.

United States Patent Office 3,046,837
Patented July 31, 1962

3,046,837
CONDENSER FOR INCREASING THE RESOLVING POWER OF MICROSCOPES
Janos Barabás, 32 Hamzsabegi ut, Laszlo Zselyonka, 74 Baross u., Ferenc Kiss, 87/c Ady Endre u., and Albert Libik, 23 Szekely Bertalan u., all of Budapest, Hungary
Filed Jan. 12, 1959, Ser. No. 790,999
Claims priority, application Hungary May 22, 1958
4 Claims. (Cl. 88—40)

This invention relates to a condenser for increasing the resolving power of microscopes with transmitted light and is an improvement in or modification of the invention described and claimed in the specification of our copending application No. 739,026.

In the specification of said application we have described and claimed a condenser for increasing the resolving power of microscopes operating with transmitted light, characterized in that at the object joint of the optical system determined by the condenser, three are provided simultaneously from at least one direction a dark ground illumination and from at least one direction a bright illumination by means of oblique rays.

Apart from the four known methods of illumination that have been hitherto used in microscopes working by transmitted light, namely bright ground illumination, dark ground illumination, side illumination by obliquely incident light, and the more recently introduced phase contrast illumination, the invention provides a fifth type of illumination in which in the manner described a bright ground illumination and a dark ground illumination are present at the same time. Which of these types of illumination should be used in given circumstances depends upon the nature of the object that is to be illuminated. It is therefore the general aim to make condensers for microscopes working by transmitted light suitable for giving any possible type of illumination and thus to make them universally applicable.

In the condenser of the present invention this object is achieved by fitting the front lens of the condenser into an exchangeable mount. It will be shown that the exchangeability of the front lens is a simple method of making the condenser suitable for giving the several types of illumination required without substantially increasing the cost of the condenser or complicating its design.

The invention will be hereinafter described in greater detail with reference to the accompanying drawings which illustrate diagrammatically and by way of example, a number of embodiments thereof, and in which:

FIG. 1 is a longitudinal section of one embodiment of condenser, said section being taken on the line I—I in FIG. 2.

FIG. 2 is a cross section taken on the line II—II in FIG. 1.

FIG. 3 is a longitudinal section of a detail, shown on a larger scale.

FIG. 4 is a plan view of the detail shown in FIG. 3.

Figure 7:
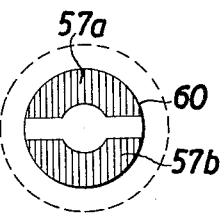
FIG. 7 represents the image appearing in the rear focal plane of the objective lens of the microscope.
Figure 8:
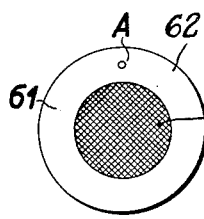
FIG. 8 is another image of the above kind.
Figure 10:
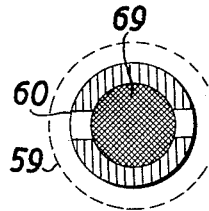
Figure 11:
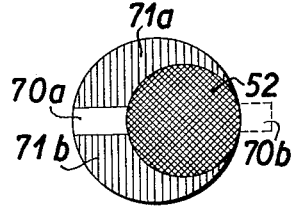
Figure 12:
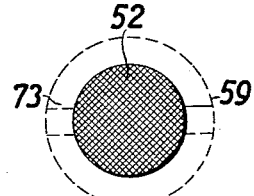

FIGS. 10 to 12 each illustrate another image of the kind shown in FIGS. 7 and 8.

In said drawings, like parts are denoted by like reference numerals.

In the embodiment illustrated in FIG. 1, the illuminating rays 21 from a source 20 pass through a collecting lens 22 and a stop 23 and are reflected by a mirror 25 which is inclined at an angle of 45° in relation to the optic axis 24 of the condenser. From this mirror 25 the illuminating rays 21 enter the opening of a condenser stop 26 and then reach a second stop 27 which will be later described in greater detail, and which passes the rays 21 in predetermined zonal areas only. The illuminating rays 21 which pass through this stop 27 reach the optical system of the condenser which consists of three lenses 28, 29 and 30. Of these, lens 30 is at the same time the front lens of the condenser. The illuminating rays 21 which leave the front lens 30 intersect at the object point 31 of the condenser and then enter the objective lens 32 of the microscope at angles determined by the condenser.

The front lens 30 is fitted in a frame structure or mount 33 which is removably attached to the condenser. To this end, mount 33 in the illustrated embodiment has an annular flange 34 which fits over the cylindrical mount 35 of the condenser, as will be readily seen by reference to FIG. 1.

The filter or stop 27 is fitted into a ring 37 inside the cylindrical interior 36 of mount 35. The optical system comprising the three lenses 28, 29 and 30 is linearly displaceable in a plane at right angles to the optic axis 24 of the condenser. To this end the condenser is provided with an annular holder 38 which is shown in plan in FIG. 2, said holder having a floor 40 with a central opening 39 for the passage of the illuminating rays 21. A lower flange 41 of mount 35 rests on this floor. As shown in FIG. 2 this flange 41 has a rectangular outline with rounded corners, parallel sides of the rectangle being guided between blocks 42a and 42b which form a linear slideway in the annular holder 38. In order to permit linear adjustment transversely across the optic axis 24 of the condenser the flange 41 is engaged by the enlarged end 44 of an adjusting screw 43, said enlarged end 44 working with play in a recess 45 of flange 41. The threaded shaft of the adjusting screw 43 turns in a tapped hole 46 in the annular holder 38. The adjusting screw can be rotated by the manipulation of its knurled head 47. Rotation of the knurled screw head 47 causes the flange 41 and hence mount 35 together with the optical system 28, 29, 30 and the stop 27 to be traversed between the blocks 42a and 42b in one direction or the other according to the direction of rotation of the adjusting screws 43, as indicated by the double-headed arrow 48.

The method of mounting the front lens 30 is illustrated on a larger scale in FIG. 3. Below the apex of the hemispherical face of the front lens, i.e. on that face of the lens which is opposite the exit face 49, is a platelike block 50 of opaque material, consisting for instance of metal or plastic, held in position for instance by cementing. The object of this plate is to permit an exchangeable masking cap 52 to be fitted to the front lens 30, the fitted cap leaving a spherical zone 51 adjacent the exit face 49 of the front lens uncovered. The cap 52 has a circular central opening 53 which closely fits over the cylindrical surface of block 50, as shown in FIG. 4. In other words, when the cap 52 has been pushed on to the bolck 50 cemented to the front lens 30 it will permit only those illuminating rays 21 to pass through the front lens 30 which enter by way of the spherical zone 51. The greater the diameter of the masking cap 52, the greater will be the opening angle α of the actually effective illuminating rays which emerge from the front lens 30. By fitting masking caps 52 of different diameters it is therefore possible to vary the width of the spherical zone 51 and hence to control the angle of emergence α of the rays 21. When this angle α is smaller than the angle which characterizes the numerical aperture of the objective lens 32, then the rays which illuminate the object point 31 will enter the objective lens. In this case a bright ground illumination will result in which the so-called central rays which enclose small angles with the optic axis 24 do not participitate. By fitting a cap 52 of suitable diameter the angle of emergence α of the rays 21 from the front lens 30 can alternatively be arranged to be greater than the angle which determines the aperture of the front lens 32, as required for producing a dark ground illumination according to the invention.

Moreover, if a unit is provided for fitting to the condenser, which comprises a mount 33 and a front lens 30 without a block 50, and which is therefore not adapted for the attachment thereto of a mask, then the central rays will emerge from the front lens 30 of the condenser and enter the objective lens 32. The result will therefore be a bright ground illumination in which illuminated rays will enter over the full aperture of the objective lens 32.

Figure 5:
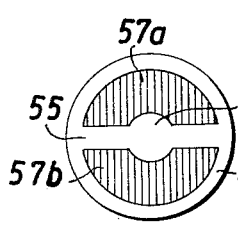
FIG. 5 is a plan view of an illustrative embodiment of a stop.

FIG. 5 is a plan view of stop 27 arranged on that side of the condenser system 28, 29 and 30 which faces the light source 20. Parts of the stop 27 are completely transparent, but the stop has at least one surface portion or field with a filtering effect. In the illustrated embodiment, the surface of the stop 27 is subdivided into several fields. The outer annular portion 54 of the surface is completely transparent. A field 55 which diametrically traverses the annular portion 54 is likewise completely transparent and, in the centre, the field 54 is enlarged to form a circular opening 56. However, the fields 57a and 57b of the stop 27 which are completely surrounded by the completely transparent fields 54, 55 and 56, transmit only part of the light. To this end these fields are coated with a film of for instance aluminum, silver, rhodium, or some other noble metal, the thickness of the film being so determined that the semi-transparent fields 57a and 57b will transmit only between 10 and 50% of the incident light. The light which passes through the surfaces or fields 57a and 57b is therefore attenuated and slightly diffused and at the same time somewhat shifted into the range of the shorter wave lengths, depending upon the spectral properties of the film. As known, this is a matter of significance from the point of view of the power of resolution of the microscope. The shorter the wave length of the illuminating light the smaller will be the details that are visible in the microscope image. The diffusion of the light rays inter alia improves uniformity of illumination.

Figure 6:
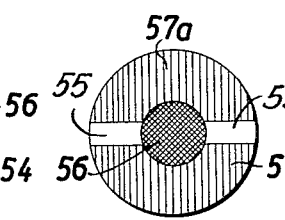
FIG. 6 is a plan view of an alternative embodiment of the stop shown in FIG. 5.

This stop 27 may also be contrived in the manner shown in FIG. 6. This embodiment differs from that illustrated in FIG. 5 inasmuch as only the diametrical fields 55 are completely transparent, whereas the fields 57a and 57b extend to the periphery of the stop and the central opening 56 is entirely opaque.

The illustrated embodiment of a condenser in accordance with the invention functions as follows:

(a) Central Bright Ground Illumination

Assuming it is desired to use the condenser for central bright ground illumination, a mount 33 will be pushed on to mount 35 with a front lens 30 lacking a mask. The image produced by the light source in the rear focal plane 58 of the objective lens 32 of the microscope will then appear as shown in FIG. 7. 59 is the image of the aperture of the objective lens, 60 is the boundary of the the condenser stop 26, whereas 57a and 57b are the images of the filtering fields of stop 27. The efficiency of such a central bright ground illumination is better than that of known illuminations of a similar kind. As has been mentioned the fields 57a and 57b pass only filtered rays of relatively short wave lengths which improve the power of resolution of the microscope. It will be readily understood that the diameter of the field of the bright ground illumination can be enlarged or reduced by adjusting the opening of the condenser stop 26.

(b) Circular Bright Ground Illumination

Figure 9:
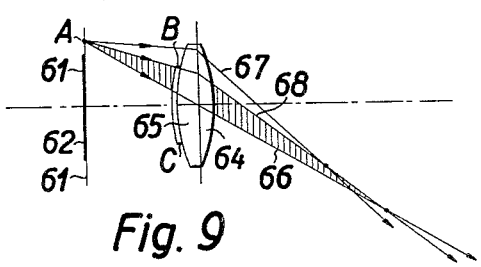
FIG. 9 is illustrative of certain optical conditions.

In order to achieve this type of illumination the central rays must be masked. As known, this was hitherto achieved by inserting what is known as a central stop into a filter holder arranged below the condenser stop 26. This central stop intercepts the central rays. In such a case the image appearing in the rear focal plane 58 of the objective lens 32 will be as shown in FIG. 8. The intercepting part of the stop is indicated by 61 and the transparent portion by 62. The condenser stop 26 is located in the focal plane F of the condenser. If therefore the condenser system is for the moment assumed to have been replaced by a single lens 64, as shown in FIG. 9, it will be immediately clear that the individual rays of a beam issuing from a point A in the bright field 61 will also pass through the centre 65 of the condenser. Actually the light rays of the beam emerging from lens 64 will not be parallel with the principal ray 66 which passes through the centre 65 because the rays which traverse the outer part of lens 64 will be considerably refracted and give rise to the aberrational effect known as coma. Owing to coma the illumination of the viewed object will not be perfect and the quality of the viewed image will therefore suffer.

However, if the stop shown in FIG. 8 is replaced by a front lens with a masking cap according to FIG. 3 the side of the lens 64 facing the incident light will pass no light within the zone B—C. Consequently, only the rays contained in the beam defined by the rays 67 and 68 will pass through the lens, so that the part of the beam between the principal ray 66 and ray 68, which in FIG. 9 is shown hatched, will be completely suppressed. Coma is thus substantially diminished. Apart from the reduction of coma the masking of the centre part of lens 64 is significant because it at the same time permits the scattered rays or the adverse effect of the rays diffracted by the edges of stop 26 to be eliminated. This is especially of importance for dark ground illumination in the case of wide apertures.

In order to achieve an all-round oblique illumination the condenser according to the invention does not therefore make use of a central stop inserted into stop 26 or into a holder located below the latter, instead of which a front lens according to FIG. 3 is pushed on to mount 35 after having been fitted with a masking cap 52 of suitable diameter for achieving the desired illumination. The image which will then appear in the rear focal plane 58 of the objective lens 32 is shown in FIG. 10. This is partly identical with the image according to FIG. 7 inasmuch as the periphery 59 of the objective aperture as well as the contour 60 of the condenser stop 26 are both again visible. However, a dark field 69 also appears which corresponds with the masked spherical cap of the front lens 30 which stops the central illuminating rays. By adjusting the condenser stop 26 the zone of circular bright ground illumination can obviously be enlarged or reduced and hence the efficiency of the illumination controlled as desired.

(c) Phase Contrast Illumination

In a manner that is well understood and which is not therefore specially illustrated condenser rings may be provided in the annular holder 38 by inserting them into a disc which is rotatable about an eccentric pivot. By exchanging the disc, illuminations suitable for different phase contrast objectives can be produced. This is as such already known, so that a further description can be omitted.

(d) Combined Illumination

For providing a combined illumination according to the invention as described in the specification of patent application No. 739,026, i.e. for providing an illumination in which a dark ground illumination from at least one direction is provided at the same time as an oblique bright ground illumination from at least one direction, use is made of a front lens 30 with a masking cap as illustrated in FIG. 3, the condenser being laterally adjusted by rotation of the knob 47 in one of the directions indicated by arrow 48 until the image shown in FIG. 11, appears in the rear focal plane 58 of the objective lens 32. Oblique rays of high intensity will then produce a bright ground illumination in field 70a, whereas in field 70b outside the aperture of the objective lens 32 light rays will be effective which have an opening angle exceeding the opening angle which corresponds with the aperture of the objective lens 32, and which therefore produce a dark field illumination. In the fields 71a and 71b fairly diffuse oblique rays of comparatively low intensity will be effective. The completely masked field 52 entirely cuts out the central rays. In such an illumination the optical illusions which adversely affect the true geometrical shape of the image are reduced to a minimum. Another advantage consists in that the disturbing effect of the overillumination of the edges of the observed object which arises in an all-round circular illumination is eliminated by the diffuseness of the lower intensity light in the fields 71a and 71b. When thus illuminated the image of the observed object 31 appears in full relief and all surface details become distinctly visible.

(e) *Dark Ground Illumination*

For this type of illumination the condenser is centralized by means of the adjusting screw 47 and the front lens 30 provided with a masking cap 52 which leaves a spherical zone 51 of a width at which the opening angle α of the rays emerging from the exit surface 49 of the front lens 30 will be greater than the angle which corresponds with the aperture of the objective lens 32. In this case the direct rays illuminating point 31 cannot enter the objective lens 32 so that an all-round dark ground illumination will result.

The image which now appears in the rear focal plane 58 of the objective lens 32 will be as illustrated in FIG. 12. The rays which are responsible for the dark ground illumination pass through the annular zone 73, the aperture of the objective lens 32 being covered by the opaque field 52. If the condenser is now traversed by the adjusting screw 47 linearly across the optic axis, for instance in such manner that the image of the light source appearing in the rear focal plane of the objective lens will have the form shown in FIG. 11 producing a combined crescent-shaped illumination, and if at the same time the aperture of the objective lens 32 is reduced by a stop associated with the objective lens of the microscope, though not shown in the drawing, until the aperture of the objective lens 32 is contained within the completely masked field 52, then a dark ground illumination will likewise result. However, this dark ground illumination is not an all-round circular illumination and might be described as a multilateral dark ground illumination which is more efficient than the all-round circular dark ground illumination. The ground of the microscopic image in such an illumination becomes as dark as could in the past be achieved only with the help of catoptric condensers (reflecting condensers). The optical conditions which bring this about will be understood from the explanations already given in conjunction with FIG. 9.

If the aperture of the objective lens 32 of the microscope is large and an iris diaphragm is provided for controlling the aperture or if the aperture of the objective lens 32 is relatively small, the transverse linear adjustability of the optical system of the condenser affords the further advantage of permitting a bright ground illumination giving a good plastic image to be gradually transformed into a dark ground illumination.

What we claim is:

1. An optical system for increasing the resolving power of microscopes operating with transmitted light and having a light source, said system comprising a frame, a condenser mounted within said frame, said condenser comprising a plurality of cooperating lenses forming the optical system and defining an optic axis, one of said lenses comprising a front lens removably mounted on one end of said frame, means mounted on said front lens along said optic axis for removably mounting a light masking cap, a light masking cap mounted on said cap mounting means, a filter mounted within the other end of said frame, and means for linearly displacing said frame in a plane at right angles to said optic axis for varying the illumination of an object.

2. An optical system for increasing the resolving power of microscopes operating with transmitted light and having a light source, said system comprising a cylindrical frame, a condenser mounted within said frame, said condenser comprising a plurality of lenses forming the optical system and defining an optic axis, one of said lenses comprising a front lens having a hemispherical surface and being removably mounted on one end of said frame, said front lens being provided with a block of opaque material secured to the apex of its hemispherical surface, a masking cap having a central opening tightly fitting over said block, a filter mounted within the other end of said frame, an annular holder for said frame having an opening extending axially therethrough, said frame being axially arranged within said holder, and means for linearly displacing said frame in said holder in a plane at right angles to said optic axis for varying the illumination of an object.

3. An optical system for increasing the resolving power of microscopes operating with transmitted light and having a light source, said system comprising a cylindrical frame, a condenser mounted within said frame, said condenser comprising a plurality of lenses forming the optical system and defining an optic axis, one of said lenses comprising a front lens having a hemispherical surface and being removably mounted on one end of said frame, said front lens being provided with means for detachably connecting a masking cap to the apex of its hemispherical surface, a masking cap attached to said connecting means, a filter mounted within the other end of said frame, an annular holder for said frame having an opening extending axially therethrough, said frame being axially arranged within said holder, and means for linearly displacing said frame in said holder in a plane at right angles to said optic axis.

4. An optical system for increasing the resolving power of microscopes operating with transmitted light and having a light source, said system comprising a cylindrical frame, a condenser mounted within said frame, said condenser comprising a plurality of lenses forming the optical system and defining an optic axis, one of said lenses comprising a front lens having a hemispherical surface and being removably mounted on one end of said frame, said front lens being provided with means for detachably connecting a masking cap to the apex of its hemispherical surface, a masking cap attached to said connecting means, a filter mounted within the other end of said frame, said filter having a first transparent portion and a second portion of reduced transparency, an annular holder for said frame having an opening extending axially therethrough, said frame being axially arranged within said holder, and means for linearly displacing said frame in said holder in a plane at right angles to said optic axis.

References Cited in the file of this patent

UNITED STATES PATENTS

| | | |
|---|---|---|
| 1,157,257 | Siedentopf | Oct. 10, 1915 |
| 1,716,308 | Foster | June 4, 1929 |
| 1,860,430 | Poser | May 31, 1932 |
| 2,182,499 | Ott | Dec. 5, 1939 |
| 2,288,143 | Sheppard | June 30, 1942 |
| 2,594,756 | Fischer | Apr. 29, 1952 |